United States Patent
Jain et al.

(10) Patent No.: US 6,343,278 B1
(45) Date of Patent: Jan. 29, 2002

(54) COMBINED ORDER LIMIT FOR A GROUP OF RELATED TRANSACTIONS IN AN AUTOMATED DEALING SYSTEM

(75) Inventors: Neena Jain, South Plainfield; Gregory D. Mills, Flanders; Edward R. Howorka, Morris Plains, all of NJ (US)

(73) Assignee: EBS Dealing Resources, Inc.

(*) Notice: Subject to any disclaimer, the term of this patent is extended or adjusted under 35 U.S.C. 154(b) by 0 days.

(21) Appl. No.: 09/390,621

(22) Filed: Sep. 3, 1999

Related U.S. Application Data

(60) Provisional application No. 60/099,243, filed on Sep. 4, 1998.

(51) Int. Cl.[7] .............................................. G06F 17/60
(52) U.S. Cl. .......................................... 705/37; 705/36
(58) Field of Search ............................... 705/35, 36, 37

(56) References Cited

U.S. PATENT DOCUMENTS

| | | | | |
|---|---|---|---|---|
| 4,674,044 A | * | 6/1987 | Kalmus et al. | 705/37 |
| 6,014,643 A | * | 6/1987 | Minton | 705/37 |
| 5,077,665 A | * | 12/1991 | Silverman et al. | 705/37 |
| 5,297,031 A | * | 3/1994 | Gutterman et al. | 705/37 |
| 5,297,032 A | * | 3/1994 | Trojan et al. | 705/37 |
| 5,375,055 A | * | 12/1994 | Togher et al. | 705/37 |
| 5,809,483 A | * | 9/1998 | Broka et al. | 705/37 |
| 5,924,083 A | * | 7/1999 | Silverman et al. | 705/37 |
| 5,950,176 A | * | 9/1999 | Keiser et al. | 705/37 |
| 6,012,046 A | * | 1/2000 | Lupien et al. | 705/37 |
| 6,098,051 A | * | 8/2000 | Lupien et al. | 705/37 |

FOREIGN PATENT DOCUMENTS

WO    WO95/26005    * 9/1995

OTHER PUBLICATIONS

"OMLX plans in both securities and derivaties" Financial Times (c) p. 31; Dialog file 583, Accession No 05796082, Mar. 1993.*

Andrew; Option analytics: A motley crew; Wall Street Journal pp. 22–24. Dialog file 15, Accession No. 01304523, Mar. 1993.*

* cited by examiner

*Primary Examiner*—Tariq R. Hafiz
*Assistant Examiner*—Romain Jeanty
(74) *Attorney, Agent, or Firm*—Ostrolenk, Faber, Gerb & Soffen, LLP

(57) ABSTRACT

An improved multiple order facility for a computerized trading system in which a first trader submits a plurality of orders for display and acceptance by other traders, including a first subsystem which permits the first trader to simultaneously generate a plurality of orders, and a second subsystem which displays the orders at computer terminals of the other traders to whom the orders were sent. Using the first subsystem, the first trader selects one or more financial instruments associated with a respective one of the orders from a displayed list of related financial instruments, selects a common quantity to be applied to each of the orders, and selects, for each order, a respective price at which the first trader is willing to buy or sell the financial instrument associated with that order. Each of the orders is then sent to a plurality of other trading using the computerized trading system. The second subsystem provides a display of the orders at computer terminals for each of the other traders to whom the orders were sent. Each order display includes the price for the financial instrument associated with the order as selected by the first trader; and an available quantity of the financial instrument associated with the order, the available quantity initially being equal to the common quantity set by the first trader and being reduced whenever a deal is made covering only a part of any of the plurality of orders by any of the other traders.

26 Claims, 4 Drawing Sheets

FIG. 1

COMBINED ORDER LIMIT FOR A GROUP OF RELATED TRANSACTIONS IN AN AUTOMATED DEALING SYSTEM

CROSS REFERENCE TO RELATED APPLICATION

This application is based on and claims the benefit under 35 U.S.C. 119 of U.S. Provisional US Application No. 60/099,243 filed on Sep. 4, 1998, which is hereby incorporated by reference in its entirety.

TECHNICAL FIELD

The present invention relates generally to an electronic brokerage system having a communication network connecting traders dealing in financial instruments, and more particularly to a computerized system for coordinated trading of multiple instruments such as different tenors of forward rate agreements for the same currency.

Commonly assigned U.S. Pat. No. 5,375,055 (Togher et al) discloses an automated matching system for anonymous trading of foreign currencies in which traders may enter bids and offers through trader workstations into a distributed matching system. Credit limits, set by the potential parties to a transaction, are stored at Market Access Nodes to which the workstations are connected. The credit limits are analyzed as part of the deal completion procedure, and deals which would exceed the credit limits are inhibited. The Market Access Nodes are linked to one or more Arbitrators and to one or more Market Distributors. The Market Distributors' function is to distribute prices of open bids and offers using a Pre-Authorization Matrix derived from credit limits stored at the Market Access Nodes. The Pre-Authorization Matrix is used to inhibit trades between incompatible counterparties and also to screen bids/offers prior to display so that bids/offers shown to a trader are "dealable", that is, there is credit available to the trader to at least partially deal the displayed quote. An improved version of this system is also known and implemented as the EBS system for anonymous dealing of spot foreign exchange transactions.

The known EBS system also includes a provision for establishing minimum and maximum amounts for any single trade by a particular trader and for establishing a default price (based on current market conditions) and amount (based on trader preference) for a single proposed trade which the trader can adjust upwards or downwards before submitting to the market for possible acceptance of other traders with whom he has bidirectional credit.

We have appreciated, however, that while many aspects of such a spot trading system are also applicable to the trading of derivatives, the derivatives market is more segmented in terms of the particular "tenors" being traded for a particular currency or other commodity, and as a result, a trader will frequently want to enter alternative proposals for a particular commodity, differing only by settlement date, gap, or other settlement terms. However, because of the fast response times inherent in an automated trading system, it is not feasible for a trader to enter the alternate proposals into the known trading system as separate orders without risking more than one such order offer being accepted before the remaining orders can be manually canceled. The situation is further exacerbated if only part of an outstanding order is accepted and/or if different orders have different associated risks or limits, so that more is required than simply canceling one order if an alternate related order is accepted.

SUMMARY OF THE INVENTION

Accordingly, there is provided an improved computerized trading system for trading financial instruments or other commodities between traders at trader terminals, wherein the trading system facilitates manual entry and possible revision of a group of related orders for derivatives based on a common underlying currency or other commodity. In particular, the group of orders may optionally be made be subject to a common order limit whereby all the related orders are automatically reduced whenever one such order is accepted. This gives a degree of control and flexibility not provided in the prior art noted above, providing greater market liquidity and flexibility of terms to potential market participants without appreciably increasing the potential exposure assumed by the market maker responsible for the multiple orders.

In one embodiment, the group of related orders are selected from a respective "sheet" of different "tenors" for forward rate agreements in the same side of the market and involving the same currency, the same gap, and the same reference rate. However, without departing from the spirit of the present invention, several such groups may combined under a single order limit, and/or the same or a combination of such groups may be subject to multiple, possibly overlapping credit limits.

In another embodiment, the sizes of the different tenors subject to a combined order limit are normalized in accordance with defined differences between the different tenors of the same group, such as gap or minimum deal size (notional amount), conventionally associated with each individual tenor.

Preferably, the available amount associated with a particular order limit is initially set above a predetermined minimum notional amount applicable to all the selected tenors in the associated group, regardless of exposure, and is automatically adjusted as the individual orders for those particular tenors are matched, completed, or re-entered. As each such adjustment to the available amount is made, the notional amounts for all of the other individual open orders subject to that same order limit are also compared with the adjusted available amount, possibly taking into account not only the actual notional amounts involved but also the relative exposure associated with each tenor and/or other market conventions used to "normalize" the minimum notional amounts frequently associated with different tenors, such as a "3-month equivalent".

It should be noted that the embodiment described later is one in which the functions of the network are distributed throughout a variety of components. This is considered to be the most effective manner of implementing the system. However, it will be appreciated that it would possible to incorporate this functionality into a system with a single location for all these functions, or into another system architecture having some aspects of a fully distributed system and some aspects of a fully centralized system.

BRIEF DESCRIPTION OF THE DRAWINGS

An embodiment of the invention will be described by way of example only, and with reference to the accompanying figures in which:

FIG. 1 depicts an overview of the trader's trading screen;

DETAILED DESCRIPTION OF THE PREFERRED EMBODIMENT

Figure 2:
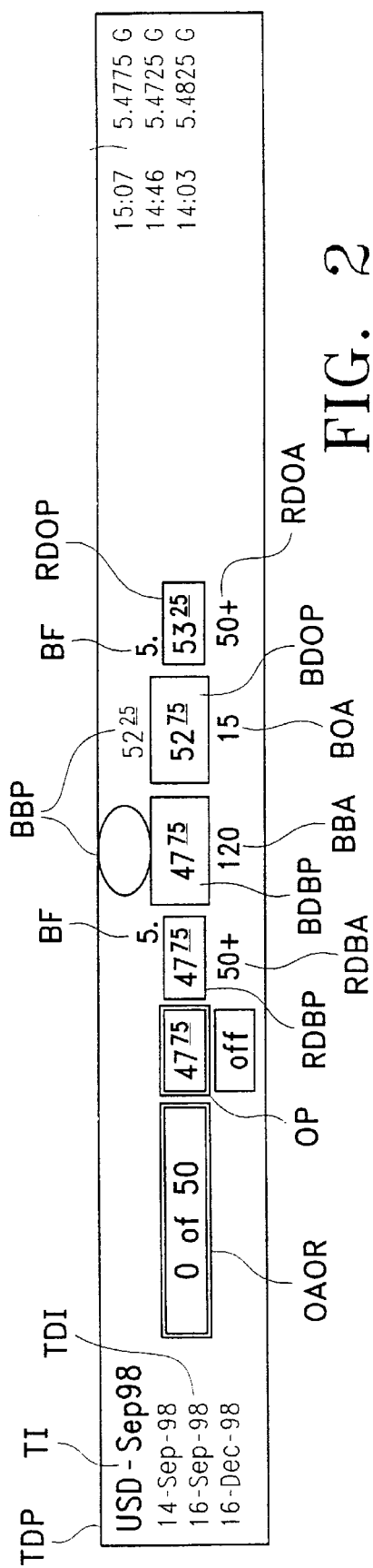
FIG. 2 shows a Tenor Detail Panel for the trader's screen shown in FIG. 1.

The system of the present invention is applicable to trading various types of derivatives contracts but is described in relation to Forward Rate Agreements (FRA) for which the described embodiment has been especially adapted.

Overview of FRA's

A Forward Rate Agreement (FRA) is a contract between two parties to lock in a forward interest rate, for a period, starting at a specific date in the future. Each FRA contract can be categorized as a spot FRA, an IMM FRA, or a broken date FRA. All these may be traded on the system of the present embodiment. IMM is the abbreviation which has become customary to refer to an instrument traded on one of the International Monetary Market dates. In brief, IMM FRAs are traded for the four International Monetary Market (IMM) dates. Spot FRAs are traded for dates associated with today's spot date. A broken date FRA is a spot FRA which is traded for a different spot date than today's spot date.

Figure 1:
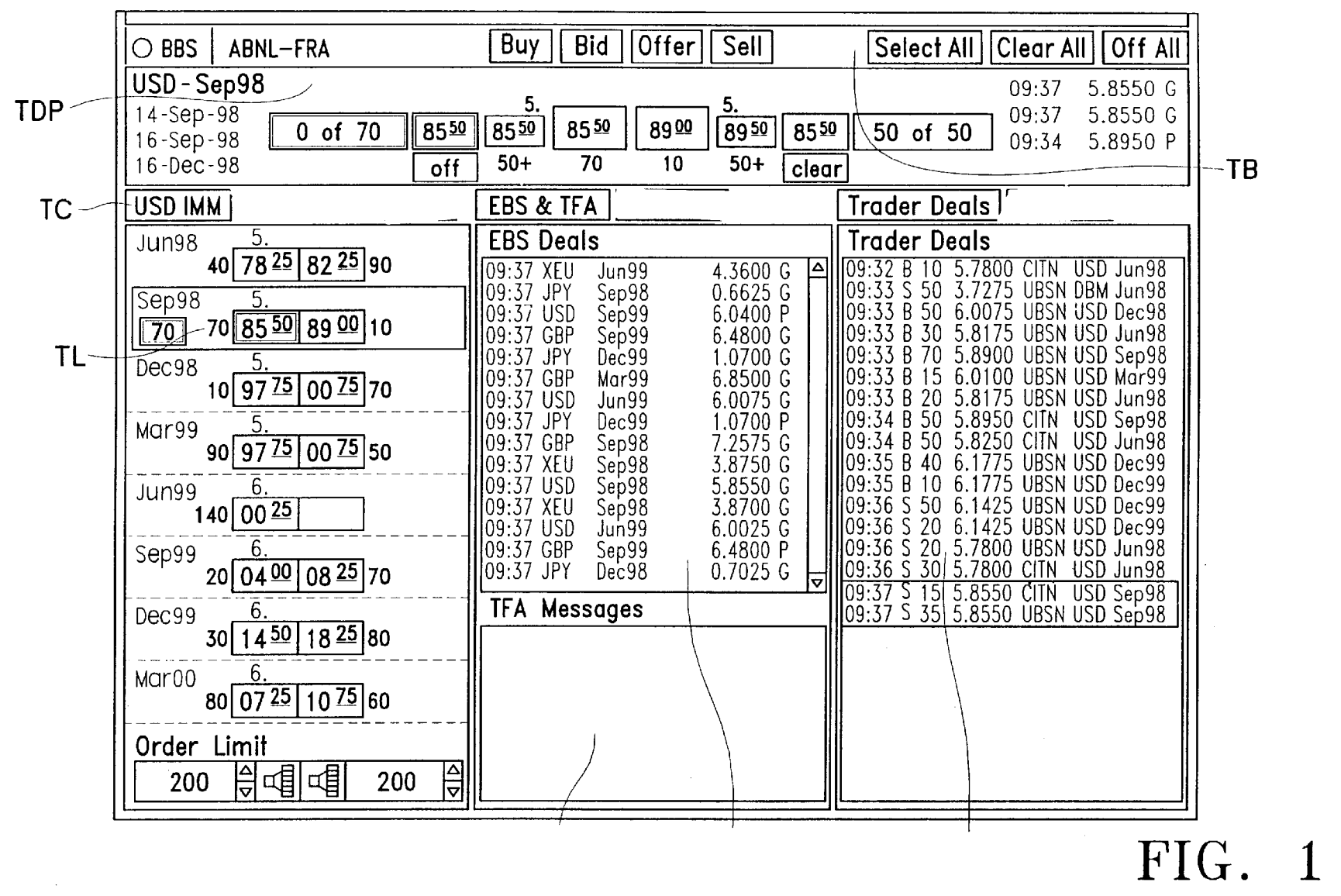

A FRA trading screen of a system embodying the invention is shown in FIG. 1. The FRA trading workstation presents a set of FRA contracts that may be traded in an electronically brokered format. Each type of contract is known as a tenor. Price information for a particular tenor is displayed on a tenor line. For each tenor line, the dealing system presents the best credit-screened bid and offer prices of all active quotes. Upon selection of the tenor line, the workstation presents a detailed view of the associated tenor showing contract dates and additional market view information.

A trader may select a tenor line and then submit one of four order types (Bid, Offer, Buy, or Sell). Each type of order requires the trader to specify an interest rate notional amount for a particular tenor. Once submitted, new orders are matched with outstanding orders in price/time priority. Compatible orders are matched resulting in the execution of deals. In order to encourage market making a trader can submit and adjust bids and offers for several tenors at a time.

For non-standard FRAs, a price inquiry function allows the trader to issue a system-wide broadcast to request a price for a broken date FRA. A trader may respond to a price inquiry by selecting the entry in the bulletin board.

The trading screen shown in FIG. 1 provides traders with the facility to enter bids, offers, buy or sell orders by selecting buttons on a toolbar at the top of the screen. The best bid/offer prices are displayed for tenors of various lines in one window and deals done by the trader and on the system as a whole are displayed in other windows. The display is better understood with reference to an example of a FRA deal.

If a single tenor is selected (for example, by means of a mouse or keypad at the trader's workstation), then the details of the FRA tenor line are presented in the top section of the screen. The detail area shows the best dealable, EBS best, and best regular prices for the selected tenor. The fixing date, settlement date, and maturity date of the active tenor are shown as well.

As explained, a Forward Rate Agreement (FRA) is a contract between two parties to lock in a forward interest rate, for a period, starting at a specific date in the future.

For example, a 6×9 FRA is a contract covering a period that begins 6 months from now and ends 9 months from now. The term or gap of such a contract is 3 months. The two counterparties, one buyer and one seller, settle by cash payment at the start of the contract (in this case 6 months from now).

The buyer of a FRA will be compensated if future interest rates rise. The seller of an FRA will be compensated if future interest rates fall.

Settlement is based on the difference between the actual interest rate prevailing on the fixing date and the rate specified in the contract, for a specific notional amount stated in the contract. Settlement takes place at the beginning of the term.

As an example, consider a USD 6×9 FRA trade for $100 million (US) at an agreed upon rate of 5.5675 executed on Sept. 9, 1997. The deal has the following characteristics:

Trade Date: Sep. 9, 1997

Spot Date: Sep. 11, 1997

Fixing Date: Mar. 9, 1998

Settlement Date: Mar. 11, 1998

Maturity Date: Jun. 11, 1998

Contract Rate: 5.5675

Notional Amount: 100 million (US$)

Reference Rate: LIBOR

The period of this deal begins on Mar. 11, 1998 (the settlement date) and ends on Jun. 11, 1998 (the maturity date). On March $9^{th}$, sometime after 11:30 AM London time, the back office personnel at each bank will look on the appropriate Reuters page to read the 3-month LIBOR rate posted for March $9^{th}$. If, for example, this rate is 5.5800 (the "Fixing Rate") then between the Trade Date and the Settlement Date, the interest rate has risen 0.0125 percent or 1¼ basis points. Therefore, a settlement amount must be calculated based on this Fixing Rate of 5.58%. The settlement amount is the amount on the check paid by the seller to the buyer. The settlement amount is calculated using the following formula:

$$\frac{\left(\frac{(\text{Fixing Rate}) - (\text{Contract Rate})}{100}\right) \cdot \left(\frac{\text{Days in Period}}{360}\right) \cdot (\text{Notional Amount})}{1 + \left(\frac{\text{Fixing Rate}}{100}\right) \cdot \left(\frac{\text{Days in Period}}{360}\right)}$$

$$\frac{\left(\frac{(5.58) - (5.5675)}{100}\right) \cdot \left(\frac{92}{360}\right) \cdot (100,000,000)}{1 + \left(\frac{5.58}{100}\right) \cdot \left(\frac{92}{360}\right)}$$

which reduces to:

$$\frac{3194.44}{1.01426} = 3149.53$$

with the denominator (1.01426) merely being a "present value" discount which takes into account the fact that although the quoted rate assumes payment of principal and interest at the end of the Period in question, settlement actually occurs at the beginning. Note that if interest rates had fallen, then the buyer of the FRA must pay the seller the settlement amount.

FRAs serve as both a hedging and a speculative instrument. A bank may use an FRA to hedge against future inflows and outflows of cash on its balance sheet, or a bank may use an FRA to speculate in the future movement of interest rates. By definition, an FRA trades over-the-counter. The resultant contract is between two parties and is therefore dissimilar to a futures contract which is traded via an exchange.

The foregoing embodiment is described in relation to IMM FRAs; that is FRAs which are based on the International Monetary Market dates. However, many aspects of the present invention are also applicable to other types of FRAs such as Spot FRAs and Broken Date FRAs.

FRAs are distinguished by the dates of the contract, the reference rate, and the contract currency. Each type of FRA contract is called a tenor. Some example tenors are listed below:

| Examples of FRA Tenors: | | |
| --- | --- | --- |
| Cash 3 month | Cash 6 month | Cash 12 month |
| USD 1 × 4 | DEM 1 × 7 | USD 1 × 13 |
| USD 3 × 6 | USD 2 × 8 | DEM 2 × 14 |
| JPY 6 × 9 | JPY 6 × 12 | USD 12 × 24 |
| | IMM FRAs with | |
| IMM FRAs | a 6 month gap | Broken Date FRAs |
| USD Sep 97 | USD Jun 97-6 | USD 3 × 6 (12) |
| USD Dec 97 | USD Sep 98-6 | DEM 2 × 14 (10) |
| JPY Mar 98 | JPY Sep 98-6 | USD 0 × 3 (3) |

The "Reference Rate" specifies how the interest rate is determined to which the contract interest rate will be fixed in order to determine the settlement amount. A common Reference Rate is LIBOR that is an acronym for London Interbank Offered Rate. Other examples include PIBOR (Paris), TIBOR (Tokyo), PRIBOR (Prague), and DIBOR (Dublin). The settlement calculation will use the interest rate associated with the turn of the contract. For example, a USD 1×4 FRA contract will have a three month LIBOR fixing. The daily set of LIBOR rates is the result of a survey of London banks and is made available on a Reuters page and later published in financial newspapers. The following list shows Reference Rates for common FRA tenors in various contract currencies.

| Currency | Reference Rate |
| --- | --- |
| USD | LIBOR |
| YEN | LIBOR |
| CHF | LIBOR |
| GBP | LIBOR |
| DEM | LIBOR/FIBOR |
| AUD | LIBOR |
| CAD | LIBOR/CDOR |
| FRF | LIBOR/PIBOR |
| XEU | LIBOR |
| ITL | LIBOR |
| ESP | LIBOR |
| PTE | LIBOR/LISFRA |
| NLG | AIBOR |
| SEK | STIBOR |
| DKK | CIBOR |
| NOK | NIBOR |

-continued

| Currency | Reference Rate |
| --- | --- |
| FIM | HELIBOR |
| BEF | BIBOR |
| NZD | KIBOR |

An instrument refers to the class of trades or potential trades which would be settled under equivalent FRA terms. (This does not include FRABBA/ISDA terms) This classification can be uniquely defined by the following criteria:

Contract Currency
Reference Rate
Fixing Date
Maturity Date

Exemplary Trader's Workstation

Turning again to FIG. 1, the screen can now be better understood. The Tenor Detail Panel (TDP) provides a detailed view of tenor line information and transaction activity for a single tenor. The Tab Controls (TC)(only one is shown in FIG. 1) allow a user to select one of several user-defined tab sheets. The user may designate the tab sheet properties and components. Although for the sake of clarity only a single tab sheet is shown, in a typical usage environment, a trader may have multiple tabs sheets, each associated with a different combination of currency and reference rate. It would also be possible to include more than one combination of currency and Reference Rate on the same sheet, thereby facilitating the creation of a single credit limit for two or more instruments which are normally not considered related. Each individual Tenor Line (TL) shows a tenor indicator (e.g., September 1998 IMM FRA for USD), best bid and offer prices, best amount available for bid and offer and a big figure.

A number of tenor lines (more than fifty) may be visible on the screen concurrently. There may be additional tenor lines that are not visible on the screen due to space constraints (identified with an appropriate Tab (T)), but can be easily brought into view. The screen also allows the trader to elect to show fewer tenors (as few as eight) depending upon the trader's preference.

The Tenor Detail Panel (TDP) is shown in FIG. 2 and shows a selected Tenor Line in more detail. It includes:

Tenor Identification (TI) (currency and description)
Tenor Date Information (TDI) (Fixing Date, Settlement Date, and Maturity Date)
Regular Dealable Bid (RDB) and Offer (RDO) Prices for "regular" amounts satisfying credit screening (A "regular" amount is an amount at least equal to a system default value representative of a typical trade in a particular currency, and may for example be 50 M pounds)
Best Dealable Bid (BDB) and Offer (BDO) Prices (the best price available after credit screening for any amount) along with the total quantity ("Best Bid and Offer Amounts") available at those prices. EBS Best Bid (BBP) and Offer (BO) Prices (the best price available on the whole system regardless of credit (even this may not be available to the trader) if this different from the corresponding Best Dealable Prices. Note that much of this information is also shown in each Tenor Line of each Tab Sheet (TS) (FIG. 1).

To the left of FIG. 2 is a bid/buy Order Status (OAOR) indicator showing the amount requested (50) and obtained (0) for an open order. If a Offer/Sell order was pending, its status would be displayed on the right.

Note that the bid (buy) prices are on the left hand side of the Tenor Detail Panel (TDP), and the offer (sell) prices are on the right hand side, and that all displayed prices are arranged in ascending order from left to right. The EBS Best Bid Price (BBP) (if shown) will always be better than the Best Dealable Bid (BDB) Price. This is because the credit granting entity for this trading floor may not have extended sufficient credit to the counterparty offering the Best Bid Price (or vice versa). Similarly, the Best Dealable Bid Price will always be at least as good as the Regular Dealable Bid (RDB) Price. In the particular example shown in FIG. 2, the Best Dealable Bid Amount is 120 which is larger than the "Regular" amount of 50, and consequently the same price (5.4775) is shown as the Regular Dealable Bid (RDB) Price and the Best Dealable Bid (BDB) Price.

Figure 3:
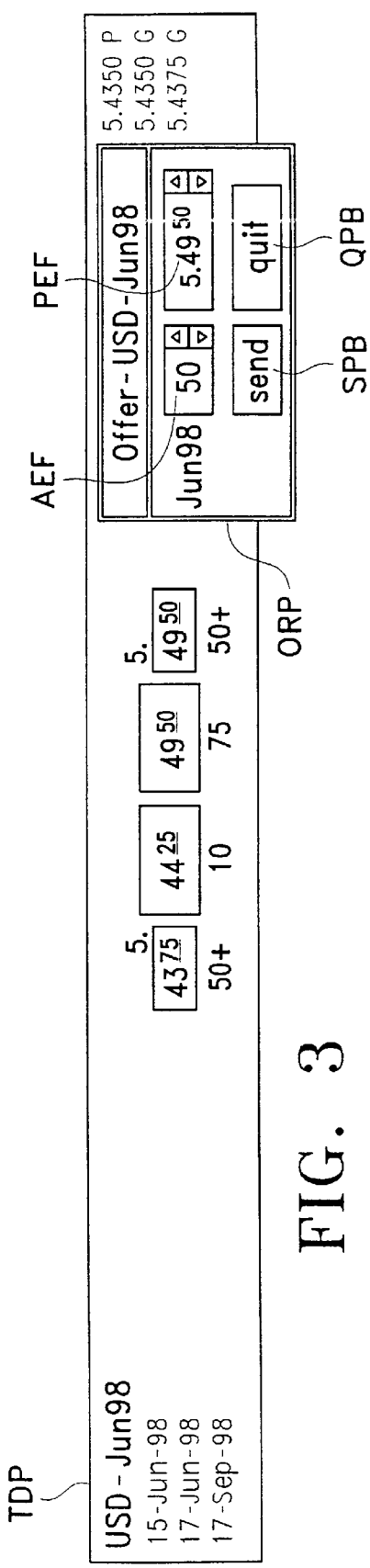
FIG. 3 shows Order Request Panel for the trader's screen shown in FIG. 1.

FIG. 3 shows the Offer Order Request Panel (ORP) which appears on the right side of the Tenor Detail Panel (TDP) when a particular Tenor has been selected and either the Offer Key (OK) or Sell (SK) Key (FIG. 1) has been activated. (A similar Bid Order Request Panel (not shown) appears on the left side of the Tenor Detail Panel when a particular Tenor has been selected and either the Bid or Buy key has been activated.) The Order Request Panel (ORP) includes an Amount Entry Field (AEF) and a Price Entry Field (PEF), both of which include Up (USB) and Down Spin Buttons (DSB) for adjusting the respect entries up or down, as well as a Send Pushbutton (SPB) for submitting the order (assuming appropriate validation checks are positive) and a Quit Pushbutton (QPB) which dismisses the Order Request Panel (ORP) without any action being taken. As previously indicated with respect to FIGS. 1 and 2, once a valid order has been submitted, its status is displayed on both the Tenor Detail Panel (TDP, FIG. 3) and in the corresponding Tenor Line (TL, FIG. 2), with the latter showing only the Amount Remaining (AR) in the outstanding order (i.e., the difference between the Amount Requested and the Amount Obtained shown in the Tenor Detail Panel).

Validation

The workstation will guard against user-input errors during order submission by providing a set of functions that validate against possible key-input errors. These validation functions may have the effect of preventing the user from entering an erroneous keystroke, preventing the user from submitting an order, or providing a warning to the user that an incorrect value may have been entered. The workstation will prevent the user from proceeding in case there a serious error condition is encountered, otherwise a warning is displayed. The workstation will display the message as set forth in Table 1 (below) and will highlight the data field in red color. Each order is validated by the system prior to submission to the market, and the trader is notified if any of the potential error conditions set forth in Table 1 are present:

TABLE 1

Deal Verification

| Buy/Sell Warning Name: | Priority: | Warning Type: | Bid/Offer Warning Name: | Priority: | Warning Type: |
|---|---|---|---|---|---|
| Price Can't Be Blank | 1 | Error | Price Can't Be Blank | 1 | Error |
| Trade Size Can't Be Blank | 2 | Error | Trade Size Can't Be Blank | 2 | Error |
| Trade Size Can't Be Zero | 3 | Error | Trade Size Can't Be Zero | 3 | Error |
| Price Can't Be Zero | 4 | Error | Price Can't Be Zero | 4 | Error |
| Price Not A Multiple of X (Where X = Price Increment) | 5 | Error | Price Not A Multiple of X (Where X = Price Increment) | 5 | Error |
| Trade Size Invalid | 8 | Error | Price matches your own order | 6 | Error |
| Trade Size > Max Trade Size | 9 | Error | Trade Size Invalid | 7 | Error |
| Check Fixing Date | 10 | Warning | Trade Size > Max Trade Size | 8 | Error |
| Large Difference | 11 | Warning | Check Fixing Date | 9 | Warning |
| Wide Spread | 12 | Warning | Large Difference | 10 | Warning |
| Check Rate | 13 | Warning | Wide Spread | 11 | Warning |
| Buy Up To? | 14 | Warning | Check Rate | 12 | Warning |
| Sell Down To? | 15 | Warning | Big Figure Adjusted | 13 | Warning |
| Check Price | 16 | Warning | | | |
| Big Figure Adjusted | 17 | Warning | | | |

An exemplary set of applicable rules follows:

1. The workstation will not allow a trader to submit more than one order on the same side of the market for a single tenor and will not allow submission of a single order for two or more tenors.
2. A trader is allowed to cancel his outstanding order at anytime.
3. The Buy and Offer orders are initiated at the Best Dealable Offer Price, unless the trader deliberately initiates a Buy at the Best Regular Offer price by clicking the Best Regular Offer price with the mouse or by pressing the buy reg key on the keypad.
4. The Sell and Bid orders are initiated at the Best Dealable Bid Price, unless the trader deliberately initiates a Sell at the Best Regular Bid price by clicking the Best Regular Bid price with the mouse or by pressing the sell reg key on the keypad.
5. The workstation will not allow a bid/buy and offer/sell order to be submitted at the same time as it will not allow bid/buy and offer/sell panels to be open concurrently.

Submitting Multiple Orders

Figure 4:
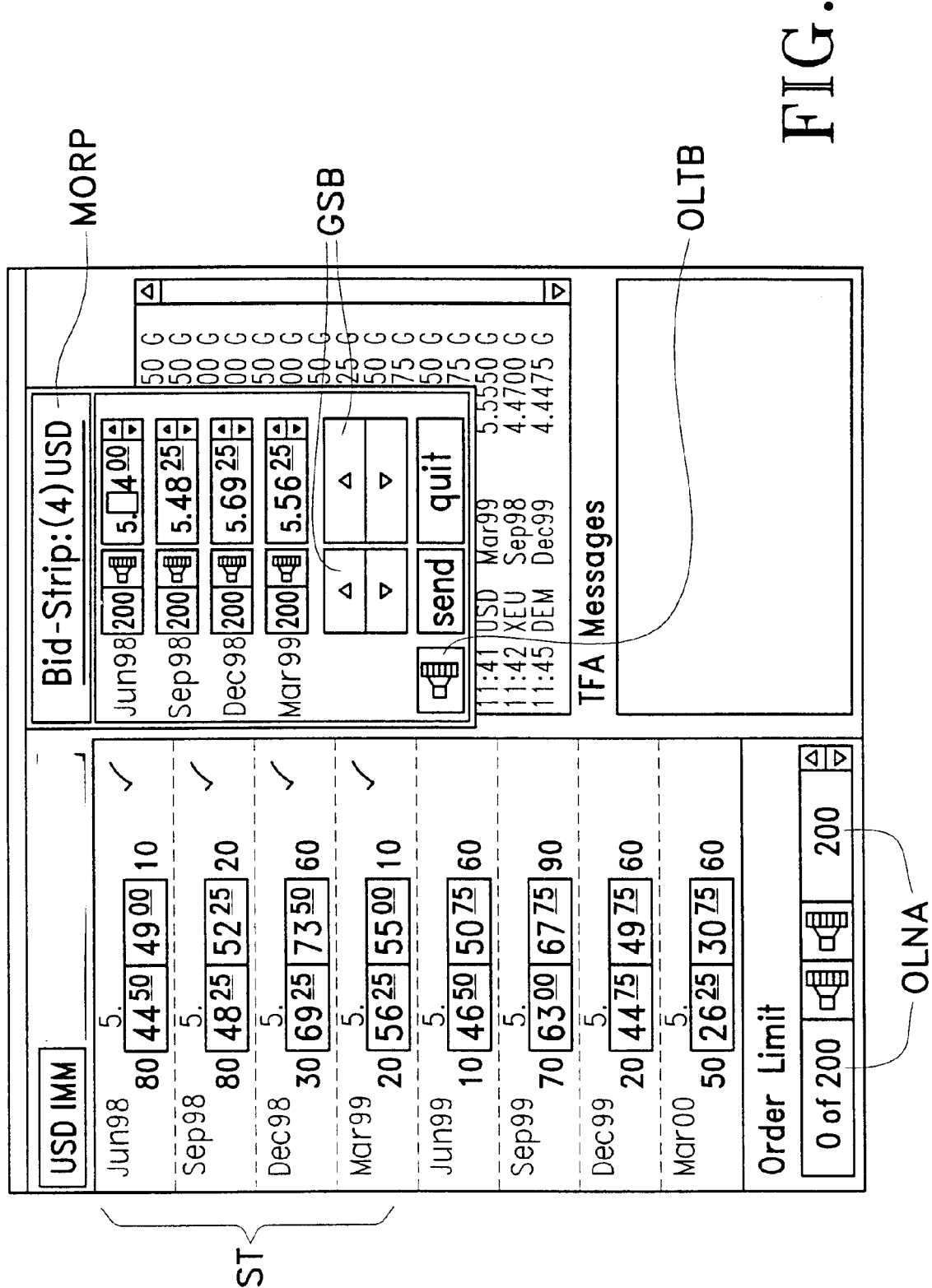
FIG. 4 shows a Multiple Order Request Panel for the trader's screen shown in FIG. 1.

Additionally, as shown in FIGS. 1 and 4, the trading workstation preferably provides many features for managing multiple orders as a group, whereby orders of similar type may be submitted for several tenors at a time. The user is able to select multiple tenors ("strip" or "group") using a mouse, keypad, or keyboard and then submit an order for all of the selected tenors with a valid price in one operation. If a single tenor holds Active Trading Focus (ATF) as shown in FIG. 1, the user is also able to click on a designated Select All (SA) button (FIG. 1) typically using a mouse or stylus (not shown) to select all (typically eight) tenors on the same Sheet (TS) and is able to submit an order for all of these tenors in one operation (the strip is highlighted and each tenor will contain a Selection Indicator e.g., a check mark). The workstation will send a separate order (Bid or Offer "quote" or Buy or Sell "hit") message to the banknode for each of the tenors selected. As in the case with submitting a single order, the workstation will present the notional amount for all of the orders such that the fields are editable using a mouse, keypad, or keyboard.

After a group of orders has been selected, they may be interrupted (Tool Bar of FIG. 1), or modified and re-submitted as a group (using the Multiple-Order Request Panel (MORP) of FIG. 4). In this way, the trader is able to adjust a strip of outstanding orders as easily as adjusting a single order.

In case of submission of multiple orders, the workstation will validate each order (as described above) and will highlight the order(s) that will have either an error or a warning condition (as described in the following sections). The workstation will prevent the submission of multiple orders as long as an error is encountered on a single order.

Multiple Order Limit

In accordance with an important aspect of the present invention, an optional Order Limit may be applied to a group of Multiple Orders involving different Tenors for the same Currency, with a separate Order Limit Notional Amount (OLNA) being established for Bids and Offers.

A trader may designate a single amount that functions as a single limit amount for multiple orders for same currency. Typically, for each combination of currency (e.g., US Dollars) and reference rate (e.g. LIBOR), there is one Order Limit Amount (OLNA) for bids and buys, and another Order Limit Notional Amount (OLNA) for offers and sells.

For a set of orders subject to an Order Limit any deal completed for one order under the Order Limit will reduce the size (that is, will reduce the notional amount) for all the orders by the deal amount. The reduced Order Notional Limit Amount will then become the available notional amount for every order submitted under the Order Limit.

When the Order Limit Notional Amount (OLNA) falls below a trader or system defined Minimum Notional Amount (MNA) parameter, all orders subject to this Order Limit are removed by the dealing system.

Both the Tenor Line (TL) and the Tenor Detail Panel (TP) of the workstation associated with the trader who has submitted an order to the market will display an Order Limit Enabled Indicator (OLEI) if an outstanding order from that trader is subject to an Order Limit imposed by that trader. The Tenor Line (TL) displays the Order Limit icon as an indicator and the amount of the outstanding order is initially set to the remaining Order Limit Amount.

The Order Limit (also called safety net) panel is displayed at the bottom of each sheet for each currency (FIG. 4). The workstation will pre-fill the Order Limit Notional Amount with the default notional amount of the first tenor on that currency sheet (e.g., for the June 1998 USD IMM tenor), which then becomes the Order Size for each of the selected tenors once that particular Order Limit has been enabled. However, in an alternate embodiment (not shown), the Order Limit may be normalized to better take into account market recognized differences between tenors in the same group (for example, to take into account different gaps, using a three month equivalent notional amount). In that case the system generated Order Size may be greater than the normalized Order Limit for those tenors having a gap less than 3 months, and may be less than the normalized Order Limit for those tenors having a gap greater than 3 months.

Once the Multiple Order Panel (MORP) has been populated with the default values for the Order Limit Notional Amount (OLNA) and the corresponding Order Size (OS) for each selected tenor (e.g., in FIG. 4 the order size 200 (million) has been entered for each tenor of the four selected), it is advantageous for the trader to be able to adjust those default values, preferably by using a group Spin Button (SB) to adjust the Order Limit Amount and all the affected Order Sizes simultaneously, providing the trader is not attempting to define an illegal Order Limit Notional Amount for one of the selected tenors on his Multiple Order Panel (MORP) (for example, an amount that is not a multiple of the Notional Amount Increment or that is less than the Minimum Notional Amount for that currency).

Once all the validations have taken place and before the individual orders are submitted to the market, the workstation creates an Order Limit object and assigns a unique safety net ID to it. It will then send a message to the network node(s) responsible for enforcing the Order Limit Amount (typically the Arbitrator (ARB) bank's Market Access Node (FIG. 5, MAN) which cooperate to perform a initial matching process and two stage commit process with the counterparty's bank on each pending deal identified in the matching process before the deal is considered complete, as discussed in more detail hereinafter under the heading "Overview of Deal Matching Process."

The Safety Net ID may consist of the following fields:
1. Floor key - floor key of the banknode
2. Session Number - session number of the trader session sent by the banknode
3. Transaction Number - unique number to be assigned by the workstation
4. Currency Key - identification of the currency involved Each safety net context will consist of four amounts:

Safety Net Amount The original or total amount of the safety net. This value is set by the workstation and sent to the arbitrator.

Dealt Amount The total amount of all completed deals made on quotes that are associated with the safety net.

Pending Amount The total amount of all pending deals associated with the safety net.

Available Amount The Safety Net Amount minus the Dealt Amount and Pending Amount.

A similar process may be performed at each involved Market Access Node (MAN) using the Order Limit Available and amount to verify that no active Order Limit Amount would otherwise be exceeded.

Addition of Order to Order Limit

A trader is allowed to submit a new order under an existing Order Limit only if the available amount in the Order Limit is more than the minimum notional amount. The workstation pre-populates the amount field in the order entry panel with the available Order Limit Amount if a trader decides to subject his order to the Order Limit. The amount field is dynamically updated whenever a message is received which reduces the available amount of the Order Limit. The trader is not allowed to change the amount of his order while subject to the Order Limit.

The workstation validates the Order Limit Notional Amount (OLNA) with the Maximum Trade Size parameter set for that tenor. Similarly, if a trader decides to submit multiple orders under the Order Limit, then each of the orders is individually validated, as described above. All the orders failing the aforementioned validation is displayed in red and an error message "Trade Size>Max Trade Size" (not shown) is displayed at the bottom of the Order Panel (OP) just above the spin buttons (SB).

Once a trader presses the Send Key, the workstation will fill the safety net ID field in the message with the safety net ID that had been previously assigned to that Order Limit and will send the message to the banknode. Both the Tenor Line (TL) and the Tenor Detail Panel (TDP) of the submitting trader will show the Order Limit Indicator (OLI).

The added order will not 'jump the queue' and in terms of the price/time continuum is placed in the queue on its own merit. There is no impact on the other orders or tenors under the Order Limit. However, orders already in the market cannot be made subject to a Order Limit without first canceling the original order, for example, by hitting one of the order keys (Buy/Bid/Sell/Offer) to thereby cancel the original order.

Removal of Order from Order Limit

A trader is allowed to remove a current order from an existing Order Limit. The workstation will cancel the order and will send an Interrupt message to the banknode. There is no impact on the other orders under the Order Limit.

If some amount had already been taken from the order prior to it being removed, the Order Limit Amount has already been adjusted and would not change further as a result of the removal. The Order Limit Amount on the remaining orders subject to the same Order Limit would remain what it was immediately before that order was removed including any prior reduction in the original Order Limit Amount.

Although the described embodiment does not include a Cancel Order Limit button which would automatically cancel all orders under the Order Limit, a trader could highlight each tenor subject to the Order Limit and hit one of the order keys (Buy/Bid/Sell/Offer) and at this point, any outstanding Orders for the selected tenors would be canceled, whether or not they were subject to any Order Limit, A trader is not allowed to increase or decrease the amount of the Order Limit while orders are in the market subject to that Order Limit.

Display of Order Amounts

There is no requirement for any special handling of amounts of orders subject to the Order Limit different from other orders, although in an alternate embodiment (not shown), all involved traders (or at least those traders having bilateral credit with the trader submitting an order that is part of the displayed Available Amount (AA) may be given a visual indication that the displayed amounts are subject to a common Order Limit, and thus the amount actually available in the market may be only a fraction of what is shown on his display. The amount displayed within each Tenor Line with an order subject to the Order Limit will typically correspond to the amount remaining in the Order Limit and available to the market (with the caveat that two tenors may be subject to a common Order Limit and thus the full available amount of the other tenor may not be available after the first is taken). The amount display in the Tenor Detail Panel for an order subject to the Order Limit typically will display in addition the original amount made available and possibly also the aforementioned indication of whether some or all of that amount is subject to a common Order Limit with one or more other tenors.

Termination of Order Limit

In order to prevent using an order limit to take unfair advantage of other traders by securing a favored position in the time/price queue maintained by the matching engine without a concomitant commitment to honor the order as originally submitted, it is desirable that the trader can neither cancel nor increase a particular Order Limit while there are any outstanding orders remaining in the market that were originally entered under that Order Limit. However, once all of the submitted orders have been dealt and/or canceled, so that the trader's order no longer has a preferential position in any applicable queue, the trader may cancel that Order Limit prior to submitting any new orders, and the workstation will send a message to the banknode to delete the Order Limit and will remove the Order Limit object.

The banknode (MAN) or arbitrator (ARB) may cancel the Order Limit if any of the validations fail at their end. In that case, the banknode will automatically cancel all the orders under the Order Limit when it cancels the Order Limit, whereupon it will send a cancel message to the workstation. The workstation, upon receiving such a cancel message will check for any outstanding orders. If there are any outstanding orders subject to the Order Limit, then it will log an error. It will then cancel all the outstanding orders subject to the Order Limit and will remove the order limit object.

Once the Order Limit Amount is exhausted or is below the minimum notional amount global parameter, the banknode will send a Done message to the workstation. The workstation will check if the order limit object still exists. If it does not exist, then the workstation will ignore the message. Otherwise, it will check for any outstanding orders under this Order Limit. If there are any orders, it will log an error and will cancel all the remaining orders and will then remove the order limit object.

Trading Floor Administration (TFA) Functions

Preferably, at least one designated trader on each trading floor has the ability to set the following parameters:

a) Notional Amount Increment

The notional amount increment is a system-wide parameter (per currency) specifying the increment between notional amount values specified during order submission. All orders submitted into the system must have a notional amount that is a multiple of this value. This parameter (and the corresponding Order Size parameter of all orders entered into the system) is preferably specified in absolute terms.

b) Price Increment

The price increment specifies the granularity between prices for orders submitted into the system. The increment is defined for each tenor or tenor category defined in the database of valid FRA instruments, and is preferably specified in absolute terms.

c) Minimum Notional Amount

The minimum notional amount is a system-wide parameter specified for each currency that specifies the minimum notional amount of an order submitted or outstanding in the system. If the remaining amount of an order falls below this value, then the remaining amount is canceled. This value is preferably expressed in three-month-equivalent terms since FRAs with shorter gaps are conventionally traded with higher notional amounts than similar FRAs with longer gaps..

d) Maximum Notional Amount

The maximum notional amount is a system-wide parameter (per currency) that specifies the maximum notional amount of an order submitted into the system. This value is also preferably expressed in three-month-equivalent terms.

Alternatively, some or all of these parameters may be administered at a system level by a designated system administrator. In either case, the matching process in the Arbitrator, the order submission process in the individual workstations, and/or both have access to these parameters (and also to other system specified parameters not considered relevant to the present invention) when executing matches.

Overview of Deal Matching Process

A match is not allowed to proceed if the credit utilization as calculated exceeds the available credit set by the TFA.

Thus, even though prescreened for credit, a further check of bids, offers, buy and sell order credit compatibility is done as part of deal matching.

Orders that are compatible are matched by the dealing system. Newly submitted bid and buy orders are matched against outstanding offer orders. Newly submitted sell and offer orders are matched against outstanding bid orders.

A new bid or buy order is compatible to an existing offer or sell order if all of the following conditions are true:

The orders are for the same tenor.

The trade floors of the orders are credit compatible with respect to this order - or - the trade floors of the two orders are identical.

The price of the bid or buy order is greater than or equal to the offer or sell order.

The amounts of both orders are greater than or equal to the 3-month-equivalent of the system defined minimum notional amount parameter.

Any order submitted into the system is first matched against all existing bids and offers at the maker's Arbitrator. The existing orders are considered in price/time order in search of compatible orders. If a compatible order is found, the two orders are "matched" and a deal is initiated for the amount equal to the minimum of the two order amounts. The process continues until the remaining three-month-equivalent amount of the submitted order becomes less than the value of the minimum notional amount parameter, or until there are no compatible orders.

If the remaining three-month-equivalent amount of the submitted order is less than the value of the minimum notional amount parameter, the submitting workstation is informed accordingly and the order is canceled.

When a newly submitted order is not completely filled during the automatch process, the order becomes either a bid or offer in the dealing system's collection of outstanding orders. The amount of the outstanding order is equal to the amount that was not matched during the automatch process.

In order to complete a deal initiated during the automatch process, the dealing system must then verify in known fashion that both of the matched orders have not been removed by the trader and that there remains sufficient credit available to complete at least a system defined minimum deal size.

The final deal amount is lesser of the initial deal amount, the available credit from the first floor (or other associated first credit granting entity) to the second floor (or other associated first Credit Group), the available credit from the second floor (or other associated second credit granting entity) to the second floor (or other associated second Credit Group), and the available amount in any applicable Order Limit. If any of these amounts is less than the 3-month-equivalent of the minimum notional amount parameter, then the matching process for this deal fails.

When matching quotes that are associated with the safety net, the arbitrator will allow a deal size up to the quote amount, or the Available Amount from the safety net, whichever is less. The matched amount will be added to the Safety Net Pending Amount. When the deal is done, the matched amount will be subtracted from the Pending Amount and the deal amount (which may be less than the matched amount) will be added to the Dealt Amount field. The Available Amount will then be recalculated.

Deal Completion Process

After a deal is initiated it is considered pending until the floors notify the responsible Arbitrator of the deal's status or the deal times out.

The deal status reflects whether the deal was actually performed and what the amount of the deal was. The amount could be different from the initial amount of the deal due to credit or Order Limit restrictions. The Market processor records the deal information. If the deal was executed for an amount smaller than the original amount, the remaining amount may be available for another match.

If the deal is subject to an Order Limit, the Dealt amount is increased by the final amount of the deal done. The Pending amount is reduced by the original amount of the deal.

If a deal fails to complete, the amount tentatively matched will be subtracted from the Pending Amount and the Available Amount (the original Safety net less any Dealt or Pending amounts) will be recalculated. The Safety Net completes when the Dealt Amount becomes equal to the Safety Net Amount. (Not when the Available Amount goes to zero, because the entire matched amount may not be dealt, thereby increasing the Available Amount to more than the Minimum Notional amount) At the same time, any outstanding quotes associated with the safety net are completed. No new quotes can be submitted under the same safety net. Any outstanding deals are allowed to finish normally.

Exemplary Trading System Architecture

Figure 5:
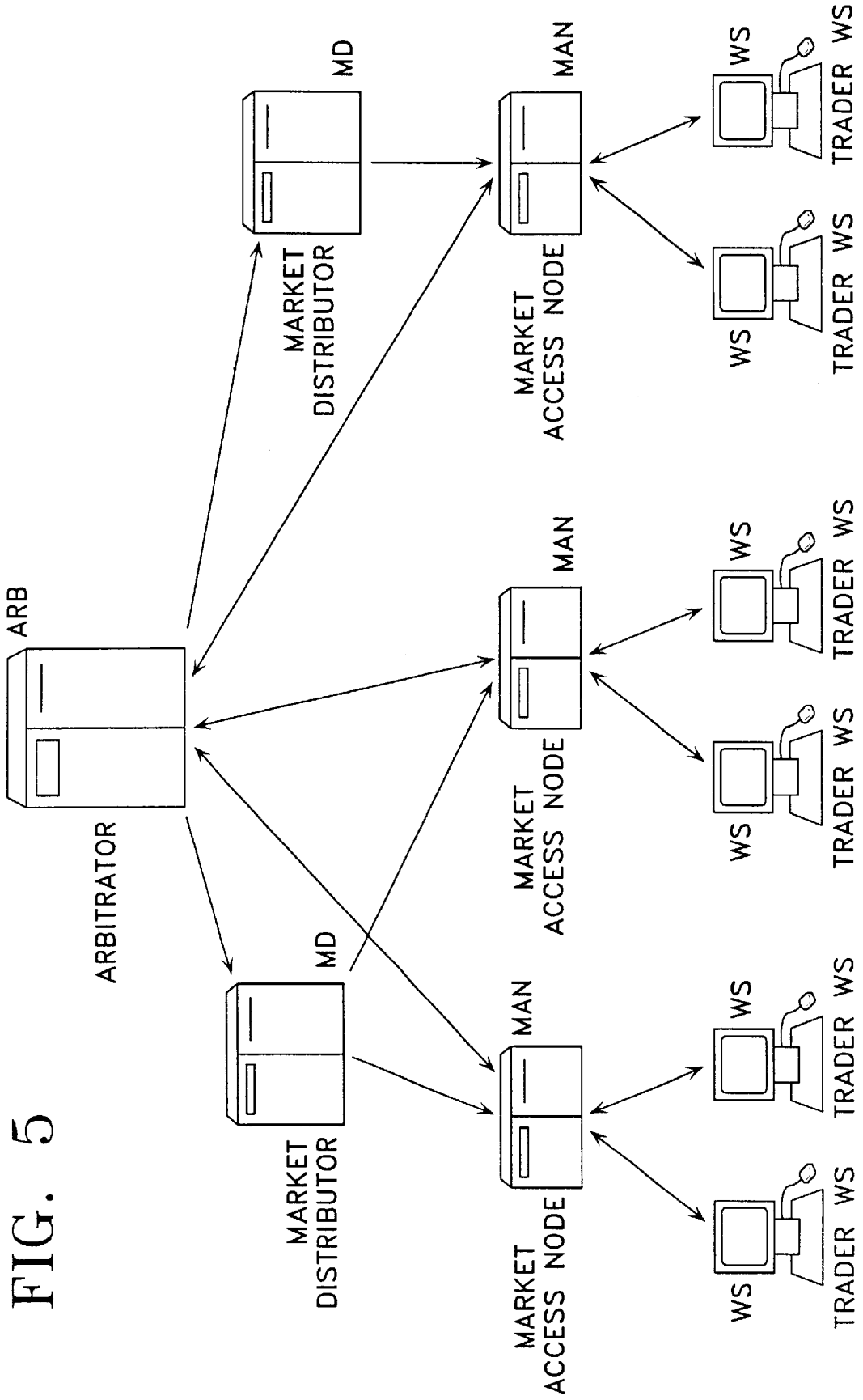
FIG. 5 shows an exemplary system architecture based on an existing EBS system.

In the described embodiment and as shown in FIG. 5, the trading system is an electronic brokerage system having a communication network for facilitating the buying and selling of futures by traders each associated with his own Workstation ("WS") located at a trading floor of a subscriber bank ("client site") and connected to a central Arbitrator (ARB), with at least the price and other market related data that is destined for more than one Market Access Node flowing through a shared Market Distributor (MD) node. For the most part, the hardware and most of the software used in this exemplary system is based on the current EBS system for foreign exchange and described in some detail in the referenced US patent, to which reference may be made. However, in part because a FRA involves only one currency, there are fewer interregional trades between geographically separated trading regions, and the overall design may be simplified by providing only one Arbitrator node. However, it may nevertheless be desirable to utilize the distributed credit utilization and dealable price screening functionality pioneered by the known EBS system. In particular, a single central Arbitrator could be dedicated to FRA trades, while several regional Arbitrators are collectively dedicated to spot FX trades, sharing the existing EBS communication network and trader workstations.

Although the existing EBS architecture (hardware and software) can be as the base for the above described FRA trading system; any required changes will be largely isolated to the Graphical User Interface (GUI) on the Workstation and in the imposition of Order Limits (both of which being described in detail above) and the credit processing on the Banknode (which is the disclosed in a copending PCT application entitled "Communication of Credit Filtered Prices in an Electronic Brokerage System", which is hereby incorporated by reference). The rest of the EBS system architecture (price making, price taking, price distribution, deal matching, system administration, etc.) may be utilized by the individual FRA tenors in a manner analogous to individual currency pairs in the known EBS spot foreign exchange dealing system.

It should be noted that a single central computer system could be used to implement the various functions described above. The system of this alternative embodiment would thus comprise a plurality of workstations connected by a network to a central computer system. This is a simpler, but non-preferred, implementation. The distributed embodiment described is considered to be a more robust and secure design.

What is claimed is:

1. In a computerized trading system for permitting a trader to submit orders for display and acceptance by other traders, an improved multiple order facility comprising:

sheet means for simultaneously displaying current market prices for a plurality of related financial instruments;

multiple selection means for selecting at least two of said plurality of related instruments;

price means for manually adjusting an associated price parameter for each of the selected instruments;

order limit means for simultaneously setting an associated size parameter for all the selected instruments to a common order limit; and submission means for submitting respective orders each including a respective price parameter and a respective size parameter for each of the selected instruments to the other traders;

wherein after any of the submitted orders subject to the common order limit is dealt on by any of the other traders for a particular deal size, the order limit means automatically reduces the size parameter of each of the other submitted orders subject to that same common order limit by an amount corresponding to that deal size.

2. The multiple order facility of claim 1, wherein the common order limit is established by the trader submitting the selected instruments, the selected instruments in at least one said multiple order are not subject to such a common order limit, and the facility further comprises size means for manually adjusting the individual size parameters for at least those selected instruments not subject to any such common order limit.

3. The multiple order facility of claim 1, wherein the orders submitted by the submitting means include bids and offers from market makers and buy and sell orders from market takers the multiple selection means presents a market maker with a current market default price for those selected instruments for which a market price currently exists and a blank price for those selected instruments for which a market price does not currently exist; and the price means is adapted to be manipulated by the market maker to individually adjust the price of each of the selected instruments.

4. The multiple order facility of claim 3, wherein the multiple selection means presents a market taker with a current market default price only for those selected instruments for which a market price currently exists; and the price means is adapted to be manipulated by the market maker to individually adjust the price of each of the instruments presented to the market taker by the multiple selection means.

5. The multiple order facility of either of claims 3 or 4, further comprising group price means for simultaneously adjusting by a predetermined increment the prices of all of the instruments presented by the multiple selection means.

6. The multiple order facility of claim 5 further comprising group size means for simultaneously adjusting by a predetermined increment the sizes of all of the instruments presented by the multiple selection means.

7. In a computerized trading system for permitting a first trader to submit a plurality of orders for display and acceptance by other traders, an improved multiple order facility comprising:

(a) means for permitting the first trader to simultaneously generate a plurality of orders by:
  (1) selecting a plurality of financial instruments from a displayed list of related financial instruments, each selected financial instrument being associated with a respective one of the orders;
  (2) selecting a common quantity to be applied to each of the orders;
  (3) selecting, for each respective order, a respective price at which the first trader is willing to buy or sell the financial instrument associated with that order; and
  (4) sending each of the orders to a plurality of other traders using the computerized trading system; and (b) means displaying the orders at the terminals of the other traders to whom the orders were sent, each displayed order showing:
  (1) the price for the financial instrument associated with the order as selected by the first trader; and
  (2) an available quantity of the financial instrument associated with the order, the available quantity initially being equal to the common quantity set by the first trader and being reduced whenever a deal is made on any of the plurality of orders.

8. The improved multiple order facility of claim 7, wherein the available quantity is reduced by an amount equal to the monetary value of any deal made on any of the plurality of orders.

9. The improved multiple order facility of claim 8, wherein a deal is made when all or part of one of the orders made by the first trader is accepted by one of the other traders.

10. The improved multiple order facility of claim 7, wherein the orders are bids and offers from market makers.

11. The improved multiple order facility of claim 10, wherein the first trader is presented with information concerning available market prices for the financial instruments selected.

12. The improved multiple order facility of claim 11, wherein the information concerning market prices is provided at least at the time that the first trader selects, for each respective order, the price at which the first trader is willing to buy or sell the financial instrument associated with that order.

13. The improved multiple order facility of claim 7, wherein the orders are buy and sell orders from market makers.

14. The improved multiple order facility of claim 13, wherein the first trader is presented with information concerning available market prices for the financial instruments selected.

15. The improved multiple order facility of claim 14, wherein the available market price information is presented at least at the time that the first trader selects, for each respective order, the price at which the first trader is willing to buy or sell the financial instrument associated with that order.

16. The improved multiple order facility of claim 14, wherein the available market price information is presented at least at the time that the first trader selects, for each respective order, the price at which the first trader is willing to buy or sell the financial instrument associated with that order.

17. The improved multiple order facility of claim 7, wherein the means for permitting allows the first trader to select the price for each respective order by manually varying a default price, the default price being set equal to an available market price for the financial instrument associated with that order.

18. A process for submitting a plurality of orders for display and acceptance by other traders, comprising:
(a) a first trader simultaneously generating a plurality of orders by:
   (1) selecting a plurality of financial instruments from a displayed list of related financial instruments, each selected financial instrument being associated with a respective one of the orders;
   (2) selecting a common quantity to be applied to each of the orders;
   (3) selecting, for each respective order, a respective price at which the first trader is willing to buy or sell the financial instrument associated with that order; and
   (4) sending each of the orders to a plurality of other traders using the computerized trading system; and
(b) displaying the orders at the terminals of the other traders to whom the orders were sent, each displayed order showing:
   (1) the price for the financial instrument associated with the order as selected by the first trader; and
   (2) an available quantity of the financial instrument associated with the order, the available quantity initially being equal to the common quantity set by the first trader and being reduced whenever a deal is made on any of the plurality of orders.

19. The process of claim 11, wherein the available quantity is reduced by an amount equal to the monetary value of any deal made on any of the plurality of orders.

20. The process of claim 19, wherein a deal is made when all or part of one of the orders made by the first trader is accepted by one of the other traders.

21. The improved multiple order facility of claim 18, wherein the orders are bids and offers from market makers.

22. The improved multiple order facility of claim 21, wherein the first trader is presented with information concerning available market prices for the financial instruments selected.

23. The improved multiple order facility of claim 22, wherein the information concerning market prices is provided at least at the time that the first trader selects, for each respective order, the price at which the first trader is willing to buy or sell the financial instrument associated with that order.

24. The improved multiple order facility of claim 18, wherein the orders are buy and sell orders from market makers.

25. The improved multiple order facility of claim 24, wherein the first trader is presented with information concerning available market prices for the financial instruments selected.

26. The improved multiple order facility of claim 18, wherein the first trader selects the price for each respective order by manually varying a default price, the default price being set equal to an available market price for the financial instrument associated with that order.

* * * * *